United States Patent
Szepesi

[11] Patent Number: 5,672,952
[45] Date of Patent: Sep. 30, 1997

[54] CONTROLLER FOR BATTERY CHARGER WITH REDUCED REVERSE LEAKAGE CURRENT

[75] Inventor: Thomas S. Szepesi, Saratoga, Calif.

[73] Assignee: Analog Devices, Inc., Norwood, Mass.

[21] Appl. No.: 674,208

[22] Filed: Jul. 1, 1996

[51] Int. Cl.$^6$ .............................. H02J 7/10; H01M 10/46
[52] U.S. Cl. ......................... 320/25; 320/39; 320/DIG. 1
[58] Field of Search ........................... 320/5, 9, 13, 14, 320/25, 32, 39, 59, DIG. 1

[56] References Cited

U.S. PATENT DOCUMENTS

| Re. 35,043 | 9/1995 | Takeda | 368/205 |
| 5,341,082 | 8/1994 | Lorenzen et al. | 320/9 |
| 5,477,124 | 12/1995 | Tamai | 320/13 |
| 5,539,299 | 7/1996 | Fernandez et al. | 320/39 |
| 5,583,384 | 12/1996 | Henry | 307/113 |

OTHER PUBLICATIONS

Chester Simpson, "Rechargable Lithium Cells: Power to Burn for Portables", *Electronic Design*, Jun. 27, 1994, pp. 39–44.

Paul Horowitz, Winfield Hill, *The Art of Electronics*, Cambridge University Press, New York, 1989, pp. 355–359.

*Primary Examiner*—Peter S. Wong
*Assistant Examiner*—Patrick B. Law
*Attorney, Agent, or Firm*—Koppel & Jacobs

[57] ABSTRACT

A battery charger controller monitors the voltage across an associated battery charger's power element and opens a switch which inhibits current flow through the controller whenever the voltage across the pass element is substantially equal to zero.

18 Claims, 4 Drawing Sheets

CONTROLLER FOR BATTERY CHARGER WITH REDUCED REVERSE LEAKAGE CURRENT

BACKGROUND OF THE INVENTION

1. Field of the Invention

The invention relates to the field of battery chargers and, in particular, to the reduction of reverse leakage current from batteries through chargers to which they are attached.

2. Description of the Related Art

Battery chargers supply charge in a controlled manner to secondary (rechargeable) batteries. A typical battery charger includes a switch which transfers charge from a power source such as a regulated DC voltage supply to battery cells, and a controller which controls the amount of charge supplied to the battery. The controller might also include battery sensing circuitry which measures the battery voltage and charging current. These measurements may be used to determine when a battery is fully charged or when the charging current to the battery is too great, for example.

A block diagram of a prior art battery charger is given in FIG. 1. A DC voltage supply is connected to provide power to the battery charging circuitry at terminals labeled $DC^+$ and $DC^-$. A current sensing resistor $R_{sense}$ is connected in series between the positive terminal of the DC supply, DC+, and a pass transistor 10. In the illustrated example the switch 10 is a power transistor, specifically, a p-channel power field effect transistor (FET) the gate voltage of which is controlled by a controller 12. Other power transistors, such as an n-channel FET or bipolar transistor may be employed as the pass transistor 10. In the illustrated example, the power FET 10 transfers charge from the DC supply to a battery 14. The sense resistor $R_{sense}$ is connected to a current sensing circuit 16 within the controller. The current sensing circuit senses the voltage drop across and, therefore, the charging current passing through $R_{sense}$. Since batteries may be permanently damaged or destroyed by excessive charging current, the controller adjusts its control output 18 in response to the sensed charging current to limit the amount of current flowing through the power element. The controller may employ conventional circuitry, such as a linear regulator or switching regulator, to control the charge flowing through the power FET 10.

The controller may also include a battery voltage sensing circuit 20 to determine the charge state of the battery 14 and to adjust the control output 18 accordingly. For example, the charge state of batteries composed of Li cells can be accurately assessed on the basis of battery voltage alone. Batteries composed of NiCad cells may require more elaborate schemes to determine the state of charge, but cell voltage is one of the factors used in this assessment.

In the process of charging a battery, charge passes from the DC+ terminal through $R_{sense}$, the power FET 10 and a diode 22(preferably a Schottky diode to reduce the forward voltage drop)to the positive terminal of the battery 14. The Schottky diode 22 is connected in series with the power FET 10 as a "blocking diode", i.e., to prevent the "backwards" flow of charge from the battery through the charging circuit (including the controller 12 and power FET 10). The need for the blocking diode arises from the presence of a parasitic body diode, BD, which is associated with power FETs, particularly discrete power FETs. That is, manufacturers connect a discrete power FET's body to its source, thus preventing the diode between body and source from being forward-biased. As long as the drain is maintained at a higher voltage than the source, it is also at a higher voltage than the body, and the drain/body junction remains reverse-biased.

However, when the DC supply voltage is removed (e.g. when a portable computer that employs an internal charger is disconnected from its AC adapter) the body diode BD between the FET's body and drain will be forward-biased and supply quiescent current to the battery charging circuit. This current could be as great as tens of milliamps and, since system designers go to great lengths to extend the operational life of battery-powered systems, is highly undesirable. Although manufacturers of integrated battery chargers, i.e., those which incorporate controllers and power FETs within the same integrated circuit, have the freedom to connect the body of the power FET to something other than the source, other arrangements pose their own problems. For example, these alternative arrangements may increase the threshold voltage of the power FET 10. Therefore, the Schottky diode 22 is employed to block this reverse current. In fact, a charger's maximum specified reverse current is often less than 10 mA, so the diode 22 must diminish the reverse current by more than five orders of magnitude. Additionally, when a bipolar power transistor is employed as the switch 10, it may also provide a conductive path, through the collector-base circuit of a PNP transistor for example, from the battery to controller circuitry, thus requiring a similar reduction in quiescent current.

However, this approach is not without its disadvantages. The diode 22 adds expense to the charger design and it occupies space which could otherwise be devoted to other system functions. Furthermore, during charging, the blocking diode 22 must carry the full charging current, which may be several amps. A multi-amp current flowing through the diode 22 dissipates a significant amount of power. Therefore, the diode 22 must be relatively large, and consequently expensive, to accommodate the power dissipation. Also, the additional power dissipation attributable to the forward drop across the diode 22 may increase the requirement for heat sinks, fans, or other heat-dissipating devices, adding still further expense and consuming more space in the system design.

The addition of the diode 22 also reduces the reliability of any system which employs such a battery charger. A system's reliability is reduced with the addition of components; not only may the component itself fail, but the solder connections and printed circuit traces which electrically interconnect it with the system may also fail.

SUMMARY OF THE INVENTION

The invention is directed to a battery charging controller which reduces reverse leakage current from a battery through the charger to which it is attached.

The invention comprises a battery charger controller which controls charge supplied to a battery from a power source through a power transistor. The controller includes a comparator that provides a control output which is responsive to the difference between the charger's input and output voltages. In a "linear" charger implementation, this voltage is sensed across the charger's power transistor. In a switch-mode charger implementation, this voltage may be sensed across the charger's power transistor or across the charger's power transistor/inductor combination. The controller further includes a switch connected in series with the charger's power return path. The comparator's control output opens the switch, thereby cutting off current flow from the battery through the charger, whenever the charger's dropout voltage, i.e., the voltage difference between the input voltage and output voltage reaches a threshold value. When a power source supplying power to the charger is disconnected, the input voltage will fall until it is within the threshold voltage of the output voltage. At this point, the comparator opens the switch and cuts off current flow through the power transistor and controller, with the exception except that a small current will continue through the comparator.

The new controller may be used in conjunction with a battery charger which utilizes a discrete power element or the power element may be integrated with the controller to provide a "single chip" battery charger. Additionally, the controller may be used with either a "stand alone" charger or one which is integrated with a battery-operated system.

These and other features, aspects and advantages of the invention will be apparent to those skilled in the art from the following detailed description, taken together with the accompanying drawings.

DETAILED DESCRIPTION OF THE INVENTION

Figure 1:
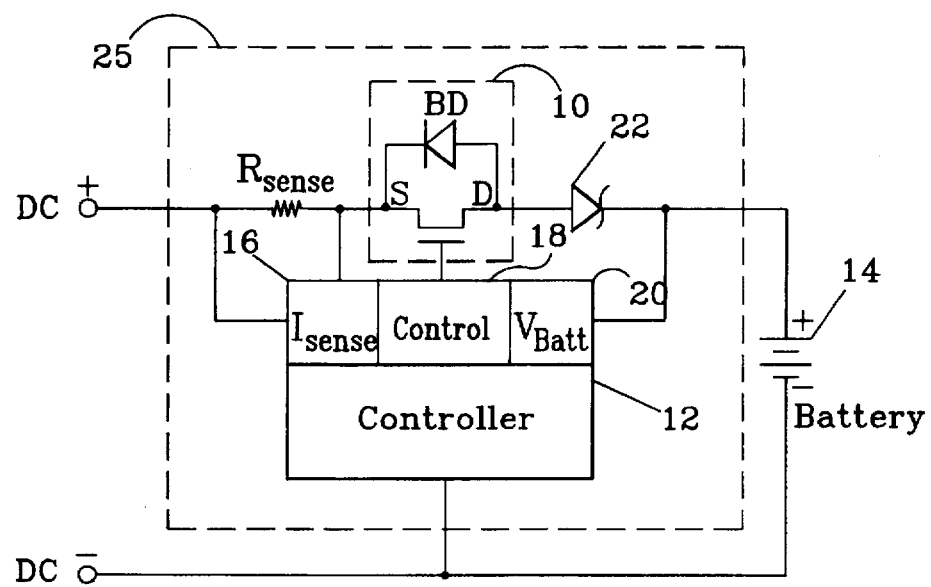
FIG. 1 is a block diagram of a prior art battery charger/battery combination which illustrates the use of a blocking diode to prevent reverse leakage current.
Figure 2:
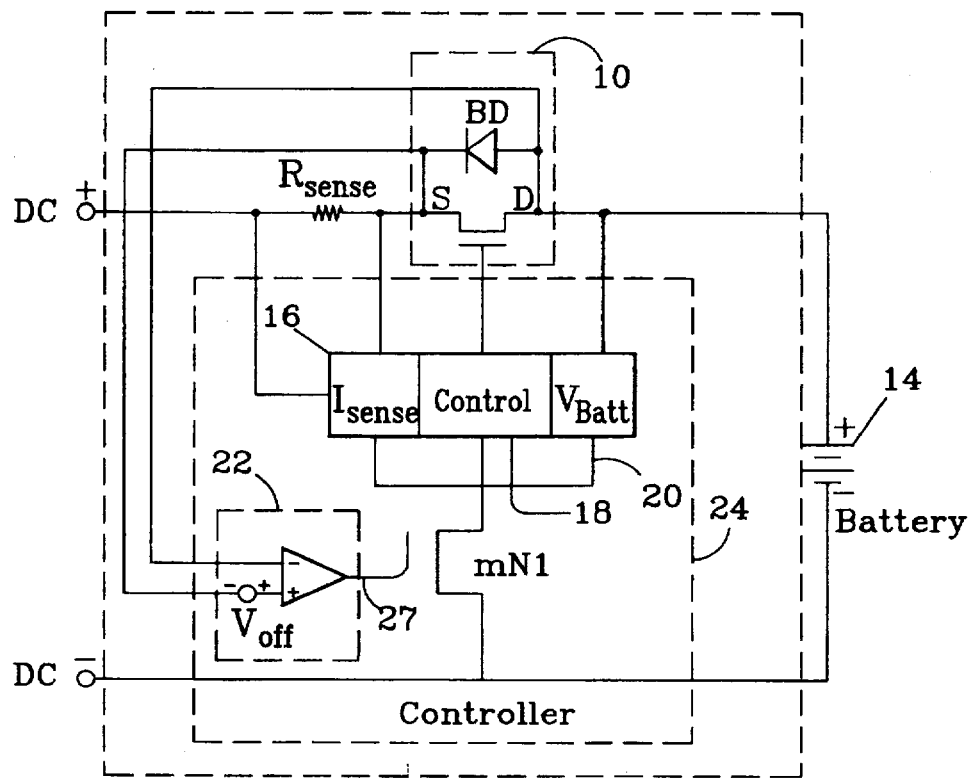
FIG. 2 is a schematic diagram that illustrates the novel battery charger controller connected in a battery charging circuit.

A novel battery charger controller which reduces reverse battery current that might otherwise be produced, e.g., when the charger's voltage supply is removed is illustrated in FIG. 2. A power transistor 10, a FET in this example, current sensing resistor $R_{sense}$, current sense circuit 16, control circuit 18, battery voltage sensing circuit 20 and battery 14 are as discussed in the background section in reference to FIG. 1. These elements are conventional and can be implemented as described, for example, in, Chester Simpson, *Rechargeable Lithium Cells: Power to Burn for Portables*, Electronic Design, Jun. 27, 1994, pages 39–44.

In this illustrative implementation, the power FET 10 is a p-channel FET with its drain D connected to receive power from a positive DC supply DC+ through the sense resistor $R_{sense}$. An n-channel FET could also be employed as the power transistor 10, with the addition of a some means, such as a charge pump, for providing sufficient gate drive voltage to the FET's gate. Bipolar transistors could also be employed as the power transistor 10. The source S of the FET 10 is connected to a positive terminal of the battery 14 and the voltage impressed upon the gate G of the FET 10 is controlled by control circuitry 18 within a novel charger controller 24. The charger controller 24 includes a comparator 22, the inverting input of which is connected to the drain D of the power FET 10 and the noninverting input of which is connected to the source S of the power FET 10. The noninverting input of the comparator 22 has a built-in offset $V_{off}$, the utility of which will be discussed shortly. In the preferred embodiment, the comparator 22 receives power from the input side of the power transistor 10, i.e., the terminal normally connected to a positive DC supply. The output of the comparator 22 is connected to the control terminal of a current control switch which, in the preferred embodiment is an n-channel FET MN1. In this case, the control terminal is the gate of the n-channel FET MN1 and the conducting terminals, the source and drain of the FET MN1, are connected in the return path between the nominal low-voltage reference terminals of the current sense 16, control 18 and battery sense circuits, and the negative reference terminal DC– (typically ground) of the DC supply.

In a first order analysis, if a positive charging voltage is present across the DC input terminals DC+ and DC–, the control circuit 18 will turn the FET 10 on (assuming that the battery is otherwise ready to be charged) and there will be a forward voltage drop across the FET from its source S to its drain D. Therefore, the noninverting input to the comparator 22 will be more positive than the inverting input and the output of the comparator 22 will be "high" (supplied by connection to the positive terminal, DC+), driving the gate voltage of the FET MN1 positive and thereby providing a low impedance path through the FET MN1 for current to return from the controller 24 circuitry to the negative terminal DC– of the DC supply.

On the other hand, if the positive charging voltage is removed, e.g., by "unplugging" the charger, the charge current will pull the voltage at the DC+ terminal lower until it reaches a level equal to the charger's output voltage plus the offset voltage. At that point, or just slightly below it, the comparator will "trip", turning the FET MN1 off and opening the controller's return path. Consequently, the FET 10 will also be turned off. The supply current to the comparator 22 will continue to pull the voltage at the DC+ terminal lower until the body diode BD turns on. Since, at this point, all the controller circuitry other that the comparator 22 is isolated from the return path, the comparator is the only component which will draw current through the body diode BD. Because this application does not require great speed, the quiescent current of the comparator 22 can be set quite low, in the 1–2 μamp range. Typically, the "on resistance" RDSon for the power FET 10, will be approximately 0.5 ohm and the quiescent current supplied to the controller 24 will be approximately 1 mA so that it would be difficult to sense the 0.5 mV drop thus generated across the FET 10 whenever the inputs DC+ and DC– are floating. The problem of sensing such a low voltage drop is circumvented by employing a comparator 22 with an offset voltage which is substantially equal to zero, typically in the 1 to 5 mV range, as illustrated. Noise and drift figures should be taken into account when choosing the magnitude of the offset voltage Voff. Additionally, since the comparator 22 trips when its noninverting input is slightly higher than its inverting input, this implementation will accommodate situations where the supply voltage falls too close to, or even less than, the battery voltage, by turning the FET 10 off even before the body diode BD turns on.

Although, on occasion, the comparator's trip point arrangement may cause the charger to cycle on and off, it will not have a negative impact on battery charging. That is, if a battery is almost fully charged and only a minor charging current is being supplied to it, the voltage across the power FET 10 may be so low that the comparator 22 will "trip" and turn off the FET MN1. But the battery voltage will eventually drop enough to trip the comparator 22 in the opposite direction and turn the FET MN1 back on. The controller 24 will then resume supplying charging current to the battery.

Figure 3B:
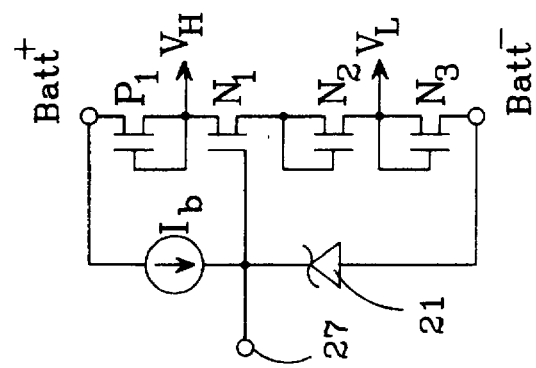
FIG. 3B is a schematic of a typical bias circuit, with connection for control, for example, by the comparator of FIG. 3A.
Figure 3A:
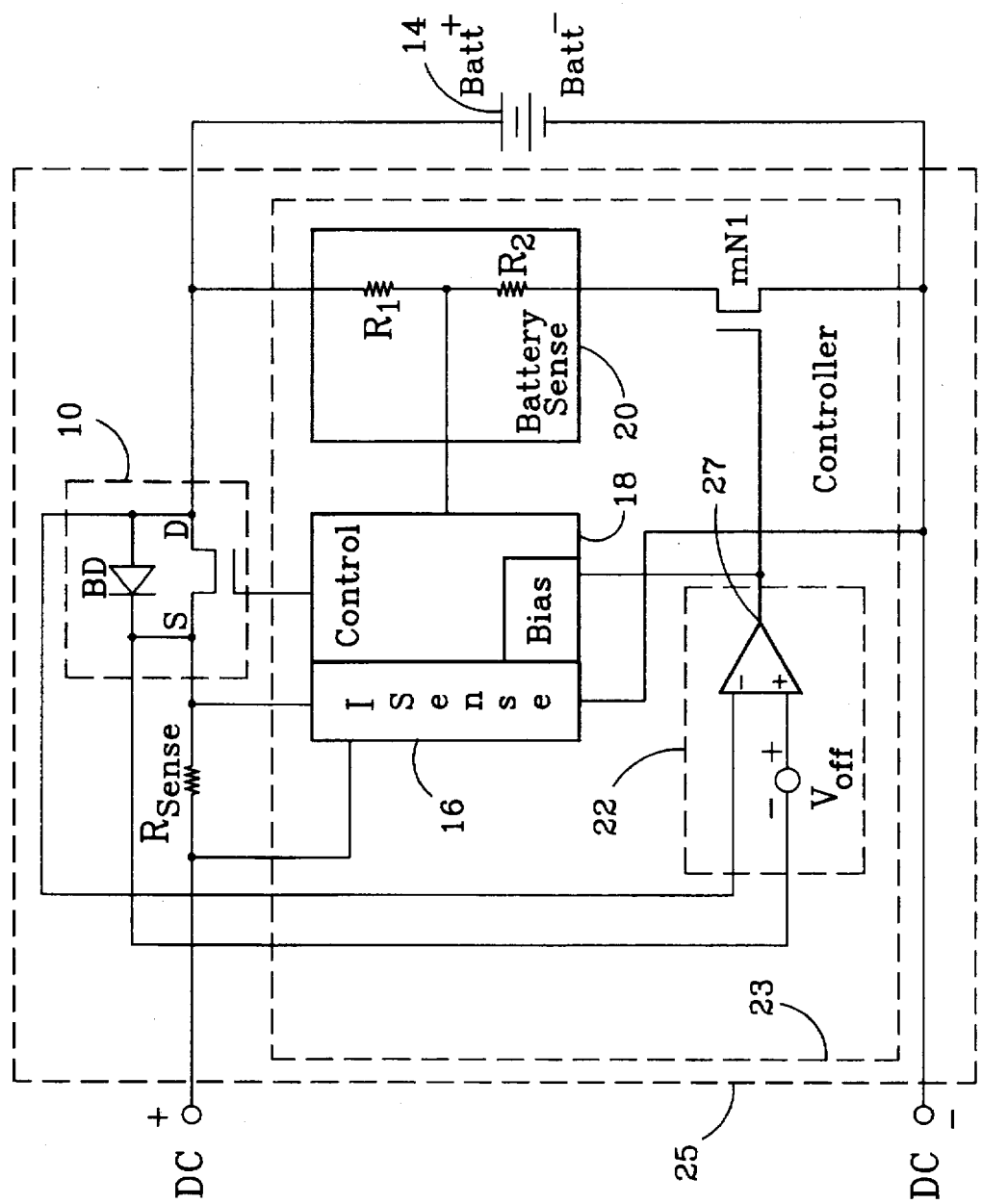
FIG. 3A is a more detailed schematic diagram illustrating the novel battery charger controller connected in a battery charging circuit.

The charging system of FIG. 3A illustrates another implementation of the novel battery charger controller 23. A sense resistor $R_{sense}$ and a power FET 10 provide a charger supply path to a battery 14, as previously described. The controller 23 includes current sensing circuitry 16, control circuitry 18, battery sense circuitry 20 and a comparator 22 with an offset voltage $V_{off}$, as described above. The battery sense circuit 20 includes a resistor divider composed of resistors R1 and R2, which provides a voltage output from the juncture of R1 and R2 to the control circuit 18 indicative of the voltage across the battery terminals. The control circuit 18 uses this information, in addition to other information, in a conventional fashion to control the gate voltage of the power FET 10. For example, if the resistor divider indicates that the battery is fully charged, the control circuitry turns the power FET 10 off.

In this implementation, the inputs to the comparator 22 are connected as described above, across the power FET 10, but the output 27 of the comparator 22 is connected to the controller's bias circuitry (see FIG. 3B for detail) as well as to the gate of the FET MN1. In this implementation, the comparator opens the return path between the battery sense circuit 20 and the DC supply return path and shuts down the controller's bias circuitry whenever the voltage drop from the source S to the drain D falls below the offset voltage $V_{off}$. This approach, i.e. using MN1 to disconnect only the return path from the controller's battery sensing circuit and disabling the remainder of the controller's bias circuitry (with the exception of the comparator), permits the use of a smaller FET for MN1.

The controller bias circuit, given in FIG. 3B provides high Vh and low Vl bias voltages for the controller circuit. The source of a p-channel FET P1 is connected to Batt+ It's gate is tied to its drain which is, in turn, tied to the source of an n-channel FET N1. The drain of N1 is tied to the gate and source of n-channel FET N2 and the drain of n-channel FET N2 is tied to the gate and drain of source of n-channel FET N3, which has its drain tied to the negative battery terminal Batt–. A current source Ib biases a Zener diode Z1 which provides a biasing voltage to the gate of n-channel FET N1. In normal operation, the biasing voltage provided by Z1 turns FET N1 on, thus providing, through cascaded FETs P1 and N1–N3, high and low bias voltages Vh and Vl. The gate of FET N1 is also connected to the output 27 from comparator 22. Therefore, whenever the comparator output 27 goes low, the FET N1 is turned off and bias voltages Vh and Vl are no longer available for the remainder of the controller circuit 23. This cuts current flow into the controller 23, with the exception of current supplied to the comparator 22.

Figure 4:
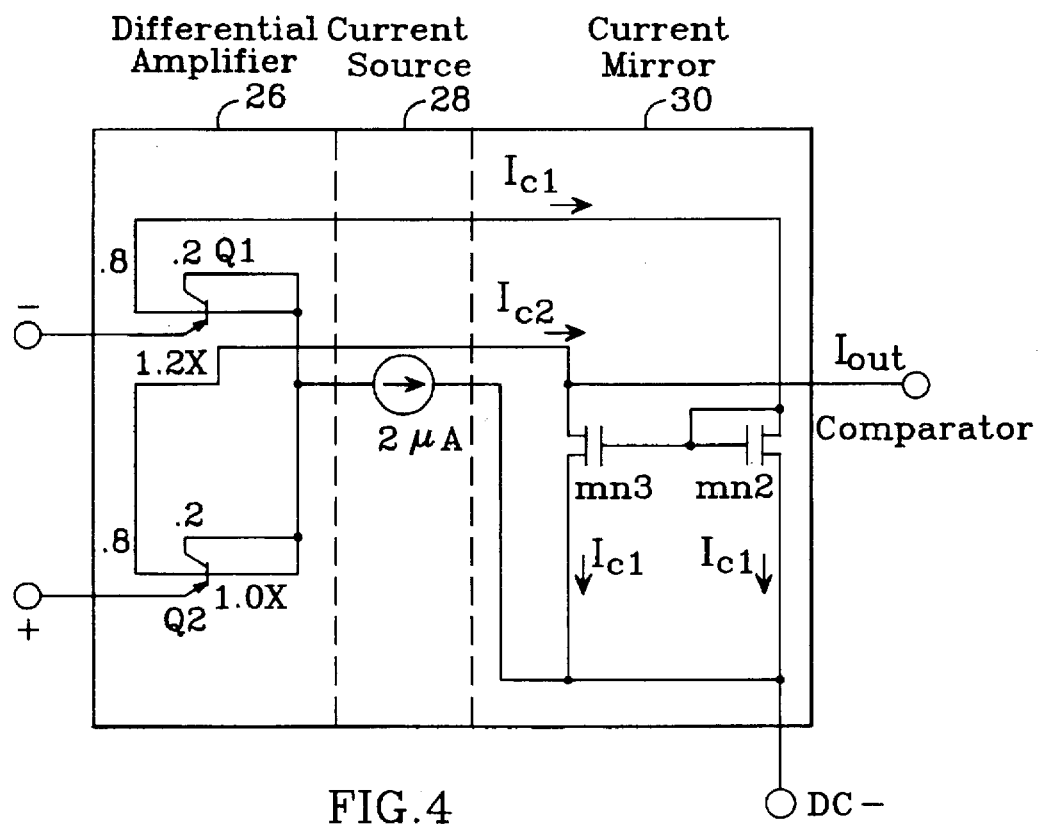
FIG. 4 is a circuit diagram of a micro power comparator with a built in offset which is employed in a preferred embodiment of the novel battery charging controller.

In the preferred embodiment of the novel controller 24, the comparator 22 with "built-in" offset is implemented as illustrated in FIG. 4. It includes a differential amplifier input stage 26, a bias current source 28 and a current mirror output stage 30. The differential input stage is composed of dual collector lateral PNP transistors Q1 and Q2, the collectors of which are split in 0.8/0.2 ratios. The noninverting input of the comparator is connected to the emitter of transistor Q2 and the inverting input is connected to the emitter of transistor Q1. The current mirror comprises two n-channel FETs MN2 and MN3, the drains of which are connected to the 0.8 collector of Q1 and to the 0.8 collector of Q2, respectively. The drain of MN2 is also tied to its gate and to the gate of MN3. The sources of the FETs are connected to the DC– terminal.

In a first order analysis, the current source 28 sinks 2 µA of collector current through the small (0.2-sized) collector of whichever dual transistor Q1 or Q2 happens to be conducting. Because the small and large transistors of each dual transistor share their base and emitter, the 2 µA current in the small dual programs a 8 µA current in the large dual. In this way, the comparator current is limited to a modest 10 µA. Collector currents Ic1 and Ic2, currents from the larger of the duals, flow from transistors Q1 and Q2 respectively to the current mirror 30 formed by FETs MN3 and MN2. Because the current Ic1 through MN2 is "mirrored" in MN3, the comparator output current Iout is equal to the difference between IC1 and IC2.

If the voltage at the comparator's noninverting input is greater than that at the inverting input, current from the current source 28 will be routed through the small collector of Q2. With Ic1 equal to zero and Ic2 equal to 8 µA, the current programmed by the bias current source, Iout is positive and the comparator output is "high". If, on the other hand, the voltage at the noninverting input is less than that at the inverting input, current from the current source 28 will be routed through the small collector of Q1. With Ic2 equal to zero and Ic1 equal to the 8 µA programmed current, Iout is negative and the comparator output is "low".

In the preferred embodiment, the emitter of Q1 has approximately 1.2 times the area of the emitter of Q2. This yields an offset of approximately 5 mV (i.e., 25.8 mV ln[A1/A2]) at the noninverting input of the comparator. The 2 µA bias current source is realized using a long channel FET or large resistor. The noise and ripple voltages of the charger input as well as drift and other design parameters, should be taken into account when determining the value of the offset voltage.

Figure 5A:
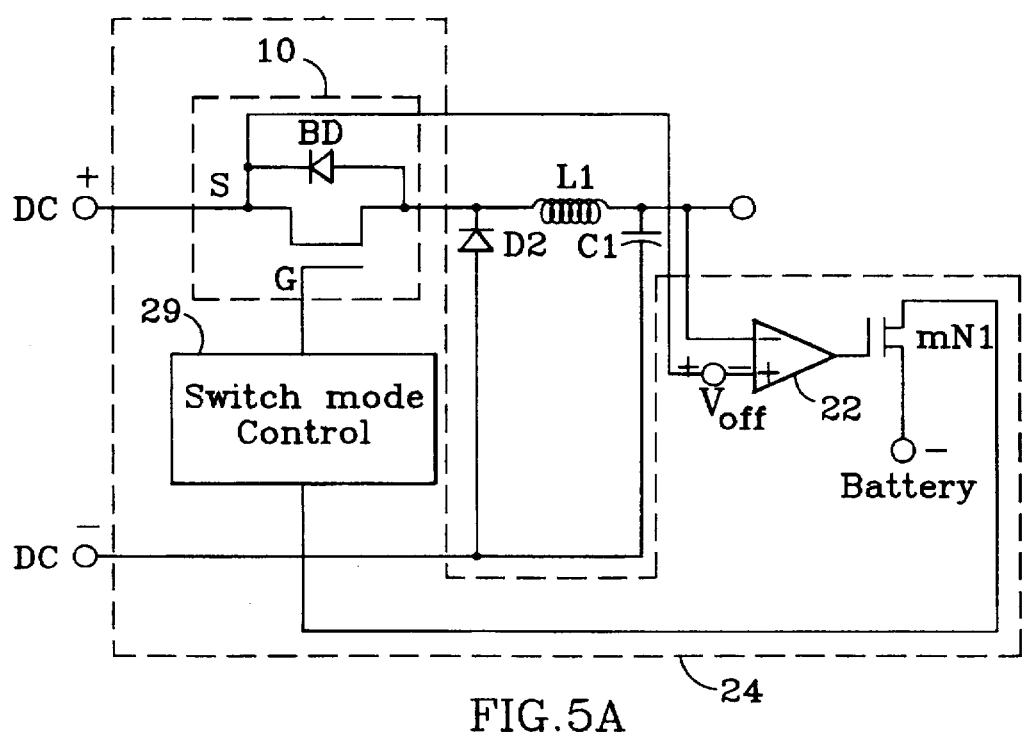
FIG. 5A is a diagram of a switchmode battery charger, based upon the novel charger controller.

The novel controller can also be used in conjunction with a switching regulator to produce a battery charger. Switching regulators are conventional and can be implemented as shown, for example, in Paul Horowitz, Winfield Hill, *The Art of Electronics*, Cambridge University Press, New York, 1989, pages 355–359. The switchmode implementation of FIG. 5A is similar to the linear regulator implementation of FIG. 4 and like elements are given like designations. The essential difference between a charger which employs a linear regulator and one based upon a switching regulator 29 is that a linear regulator provides substantially continuous current through the power transistor, a switching regulator 29 regulates the charge flow through the power transistor by switching it on and off. Current flows through the FET 10 into an inductor L1, charging a capacitor C1 when the FET 10 is "on". A diode D2 acts as a "flywheel", supplying current to the inductor L1 when the FET 10 is switched off.

The switching regulator 29 adjusts the frequency or pulse-width of the pulse train used to switch the power transistor, thereby regulating the average current through the FET. In a manner similar to that of the linear charger implementation, the new switchmode charger controller includes a comparator 22 which compares the voltage at the power transistor's source to that at the capacitor C1 and opens the controller's return path when this voltage equals the comparator's offset voltage. Because of the switching noise and ripple on the inputs to the comparator 22, the offset voltage $V_{off}$ should be set higher than in a linear implementation. As an alternative, since the controller 24 needn't respond instantaneously, filter capacitors may be placed on the inputs to the comparator 22.

Figure 5B:
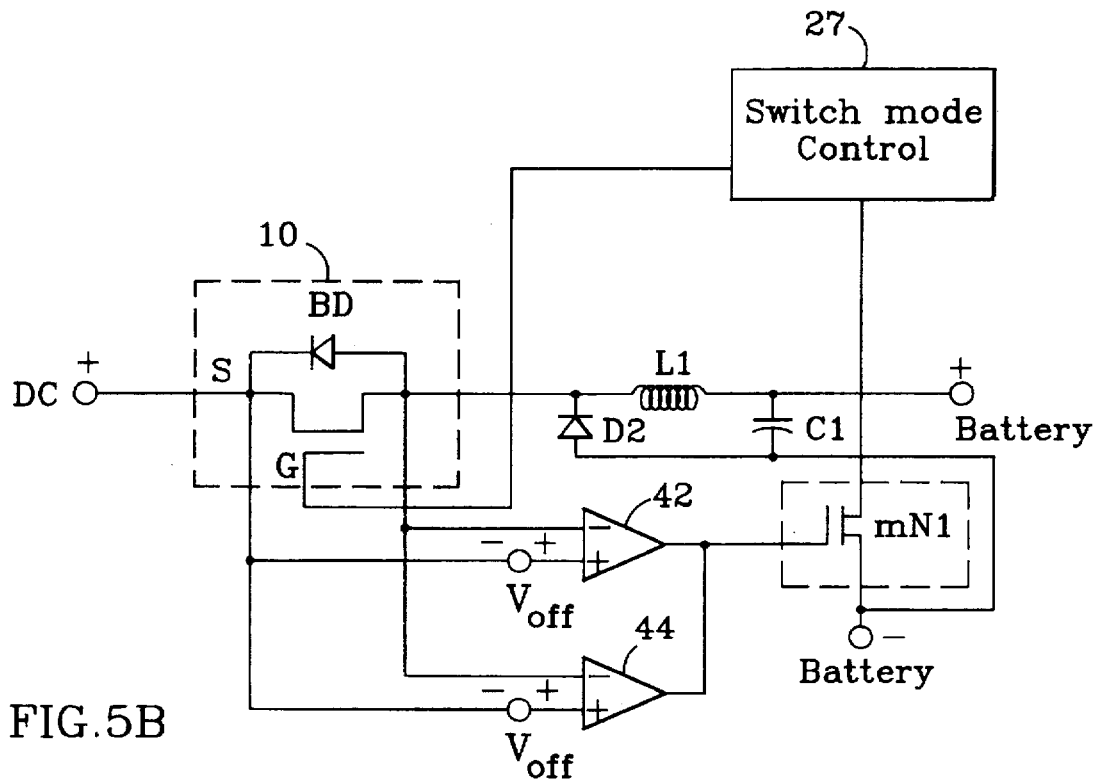
FIG. 5B is a diagram of an alternative implementation of a switchmode battery charger, based upon the new charger controller.

In the switchmode implementation of FIG. 5B, the comparator opens the return path during the relatively short period within a switching cycle that the power transistor 10, an n-channel FET in this illustrative example, is conducting, i.e., the conducting phase. During this period substantially the entire voltage drop from the charger's input to the battery falls across the FET 10. Therefore, if the input terminal to the charger is floating or otherwise provides an inadequate charging voltage, the comparator will detect the condition and "trip". On the other hand, when the FET 10 is turned off, an inductor pulls the drain of the FET 10 to a negative diode drop (~0.6V) below the return voltage Batt– and the comparator will not trip, even if the input voltage is inadequate; the return path remains open and the power FET's body diode will conduct a reverse current during the conducting phase of every cycle. Therefore, it is desirable that the controller's return path be opened within a single conducting phase.

The dual-comparator implementation of FIG. 5B provides sufficient speed to open the return path of a switchmode controller 29 during a single conducting phase. Two comparators 42 and 44 such as described in detail in relation to FIG. 4, are connected in parallel to the source and drain of power FET 10, as described in relation to FIGS. 2 and 3. Comparator 44 is larger, i.e., has greater output drive, than comparator 42. The outputs of the comparators are connected to the gate of n-channel FET MN1 which is connected, as described in detail in relation to FIGS. 2 and 3, between the controller's nominal return terminal and the system return Batt–. In the preferred embodiment, the comparator 42 is a low power comparator, identical to the comparator of FIG. 4. The comparator 44, on the other hand, provides substantially more drive current, approximately 100 μA in the preferred embodiment. The 110 μA drive current provided by the parallel combination of comparators 42 and 44 is sufficient to open the n-channel FET within one conducting phase.

However, 110 μA is substantially greater than the 10 μA standby current target of this exemplary embodiment. For this reason, the bias current source 28 of the comparator 44 is controlled by the outputs of the comparators and as the n-channel FET is turned off, so is the comparator 44. Control of this bias current may be affected as discussed in relation to FIG. 3B. In standby, i.e., when the controller's return path is open, the comparator 42 continues to operate and, whenever the charger's input voltage reaches a sufficient level, the comparator 42 turns the n-channel FET MN1 and the comparator 44 on.

Figure 6A:
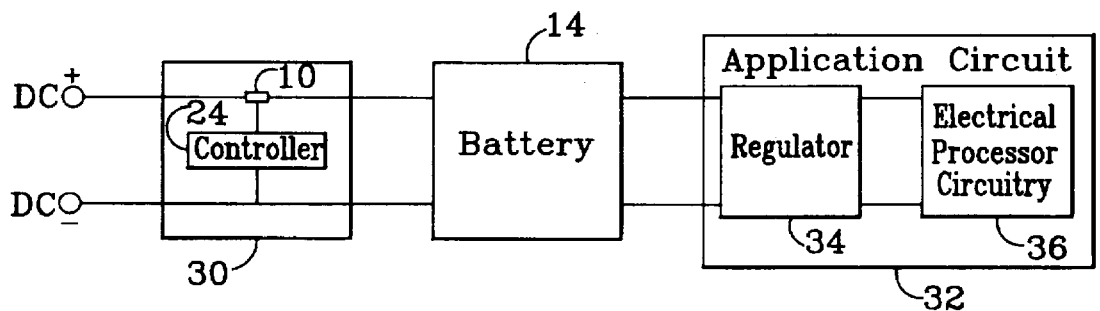
FIG. 6A is a block diagram of a battery operated system, including a voltage regulator and electronic processing circuitry, which employs the novel battery charger controller.

The block diagram of a battery-operated system in FIG. 6A illustrates the use of a charger 30 which employs the novel charger controller 24 with application circuitry 32 that performs electronic processing. The charger 30 receives power from the input terminals DC+ and DC– and employs the controller 24 to control the delivery of power through a power switch 10 to a battery 14. The battery provides stored electrical energy to the application circuitry 32 which is connected to the battery terminals.

The application circuitry 32 includes a regulator 34 connected to receive electrical energy from the battery 14, the voltage of which may vary widely through its discharge cycle. The regulator produces electrical energy at a prescribed voltage for the electronic processing circuitry 36 to which it is attached. The electronic processing circuitry 36 may take the form of memory, a microprocessor and a display in the case of a laptop computer, a radio frequency transmitter and receiver with keyboard and microphone in the case of a cellular telephone, or many other generally portable devices. Regardless of the specific implementation, the novel battery charger controller 24 provides control over the charge flow for charging the battery 14, and prevents a reverse current flow without using a blocking diode in the charge flow path as in conventional chargers.

In one implementation of such a system, e.g. a laptop computer, the charger 30, battery 14 and application circuitry 32 are housed in one package and the DC input power is provided by a wall adapter which converts AC power from a wall plug into DC power at a voltage which is sufficient to charge the battery. Novel circuitry within the controller 24, discussed above, prevents the backward flow of charge from the battery through the controller whenever the input voltage to the charger is below a desired level, for example, when the wall adapter is not present at the DC terminals. Additionally, the battery 14 may include backup cells connected in parallel with the output terminals of the regulator 34. The backup cells or backup battery is included to provide a relatively short-term power source for the application circuitry 32 whenever the main cells within the battery 14 are unable to. By employing the new controller within the regulator 34, reverse current flow from the backup battery through the regulator is also thwarted.

Figure 6B:
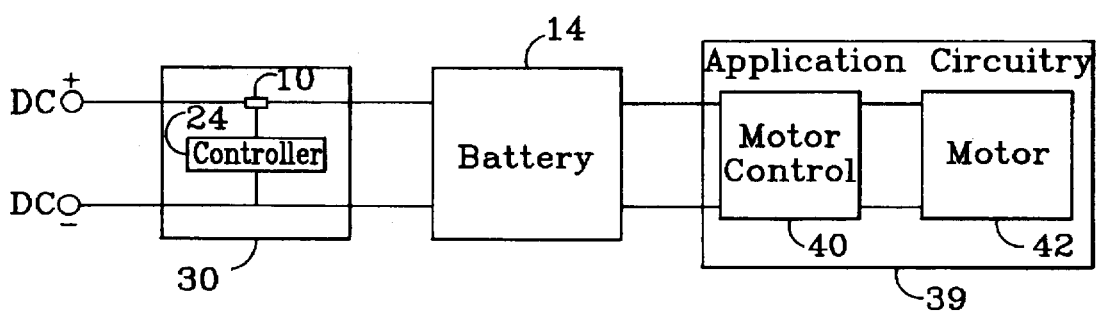
FIG. 6B is a block diagram of application circuitry, including motor control circuitry and an electric motor, which employs the novel battery charger controller.

The block diagram of FIG. 6B illustrates another electronic system in which the novel battery charger controller may be employed. The application circuitry 39 in this implementation includes a motor control circuit 40 that is connected to provide power from the battery 14 in a timed fashion to a motor 42. Specific implementations of the application circuitry of FIG. 6B include portable battery-operated screwdrivers vacuum cleaners and lawn-care products to name just a few.

The forgoing description of specific embodiments of the invention has been presented for the purposes of illustration and description. It is not intended to be exhaustive or to limit the invention to the precise forms disclosed, and many modifications and variations are possible in light of the above teachings.

For example, although the specification refers to battery in the singular, one or more battery packs, each having one or more cells, may be charged. Although the power transistor is illustrated as a p-channel FET an n-channel FET or bipolar transistor may be used. In a switchmode implementation, the two comparators which are connected in parallel could be of equal size and may operate to open the controller's return path over a period of more than one conduction phase.

The embodiments were chosen and described in order to best explain the principles of the invention and its practical application, to thereby enable others skilled in the art to best utilize the invention. It is intended that the scope of the invention be limited only by the claims appended hereto.

I claim:

1. A battery charging controller which limits reverse leakage current through a power transistor from a battery to which an associated battery charger is connected, comprising:

battery charging control circuitry having an electrical return path, a comparator connectable to an associated power transistor having two conducting terminals, said comparator having noninverting and inverting inputs for connection to the conducting terminals of said associated power transistor and an output that is responsive to a voltage imposed across said inputs, and a current control switch having a control terminal connected to the output of the comparator and two conduction terminals connected between the controller's return path and an associated negative reference terminal such that, when closed, the switch forms a low-impedance path between said return path and negative reference terminal.

2. The controller of claim 1, wherein one of said associated power transistor's conducting terminals is connected to a battery, and the inverting input of said comparator is connected to the battery-connected terminal of said associated power transistor and the noninverting input of said comparator is connected to the other conducting terminal of said power transistor.

3. The controller of claim 2, wherein an offset voltage is connected in series between said other conducting terminal of said associated power transistor and the noninverting input of said comparator.

4. The controller of claim 3, wherein said offset voltage is substantially equal to zero.

5. The controller of claim 1, wherein said current control switch is an n-channel FET.

6. The controller of claim 1, wherein said current control switch is a p-channel FET.

7. A battery charger which limits reverse leakage current, comprising:

a power input, a power switch connected between said power input and a battery being charged, said power switch arranged to control the flow of a charging current from the power input to the battery being charged, said power switch being subject to a reverse bias leakage current, a controller arranged to determine a charge state for the battery being charged and which operates the power switch in response to the charge state, said controller being subject to a reverse bias leakage current through the power switch, a current control switch connected to inhibit the flow of reverse bias leakage current through the controller, and a sensor connected to sense the proximity of a reverse bias leakage condition for said power switch, and in response to open said current control switch.

8. The charger of claim 7, wherein the power switch is a power FET.

9. The charger of claim 7, wherein said power switch has a first terminal connected to said power input and a second terminal connected to a battery being charged, said first and second terminals being at respective voltages, and the sensor is a comparator having inverting and non-inverting inputs which is connected to compare the voltage at the power-connected conducting terminal of said power switch to the voltage at the battery-connected conducting terminal of the power switch and to open the current control switch when the voltage at the power-connected terminal does not exceed the voltage at the battery-connected terminal by at least a predetermined amount.

10. The charger of claim 9, wherein an offset voltage is connected in series between the power-connected conducting terminals of said power switch and the noninverting input of said comparator.

11. The charger of claim 10, wherein said offset voltage is substantially equal to zero.

12. The charger of claim 7, wherein said controller is a linear controller.

13. The charger of claim 7, wherein said controller is a switchmode controller.

14. A battery charger which limits reverse leakage current, comprising:

a power input, a power switch connected to control the flow of charging current from the power input to a battery being charged, said battery being charged having a respective voltage, said power switch being subject to a reverse bias leakage current, a controller arranged to determine a charge state for the battery being charged and which operates the power switch in response to the charge state, said controller being subject to a reverse bias leakage current through the power switch, a current control switch connected to inhibit the flow of reverse bias leakage current through the controller, circuitry connected to sense the voltage of the battery being charged, a second current control switch connected to inhibit the flow of current through said battery voltage sensing circuitry, and a sensor connected to sense the proximity of a reverse bias leakage condition for said power switch, and in response to open said current control switch.

15. A battery operated device including a battery charger controller which limits reverse leakage current from a battery, comprising:

a battery charger comprising a power input, a power switch connected to control the flow of charging current from the power input to a battery being charged, said power switch being subject to a reverse bias leakage current, a controller arranged to determine a charge state for the battery being charged and which operates the power switch in response to the charge state of the battery being charged, said controller being subject to a reverse bias leakage current through the power switch, a current control switch connected to inhibit the flow of reverse bias leakage current through the controller, a sensor connected to sense the proximity of a reverse bias leakage condition for said power switch, and in response to open said current control switch, a battery having two terminals and connected to receive charging current from said charger, and electronic application circuitry connected to receive operational power through said battery terminals.

16. The battery operated device of claim 15, wherein said application circuitry comprises:

a voltage regulator circuit connected to receive power from said battery and to produce power at a regulated output voltage, and electronic processing circuitry connected to receive power from said voltage regulator.

17. The battery operated device of claim 15, wherein said application circuitry comprises:

an electric motor, motor control circuitry connected to receive power from said battery terminals and to produce output control signals for said electrical motor, said electrical motor connected to receive operational power under control of said motor control circuitry from said battery terminals.

18. A voltage regulator which limits reverse leakage current, comprising:

a power input, a power switch connected to control the flow of current from the power input to a power consuming circuit having an associated voltage, said power switch being subject to a reverse bias leakage current, circuitry connected to sense the voltage of the power consuming circuitry, a controller which operates the power switch in response to the voltage of the power consuming circuitry, said controller being subject to a reverse bias leakage current through the power switch, a current control switch connected to inhibit the flow of reverse bias leakage current through the controller, and a sensor connected to sense the proximity of a reverse bias leakage condition for said power switch, and in response to open said current control switch.

* * * * *